(12) United States Patent
Johnson et al.

(10) Patent No.: US 6,204,428 B1
(45) Date of Patent: Mar. 20, 2001

(54) ELECTROCHEMICAL MEMBRANE INCINERATOR

(75) Inventors: Dennis C. Johnson; Linda L. Houk; Jianren Feng, all of Ames, IA (US)

(73) Assignee: The United States of America as represented by the United States Department of Energy, Washington, DC (US)

(*) Notice: Subject to any disclaimer, the term of this patent is extended or adjusted under 35 U.S.C. 154(b) by 0 days.

(21) Appl. No.: 09/206,958

(22) Filed: Dec. 8, 1998

(51) Int. Cl.[7] .................................................. C02F 1/461

(52) U.S. Cl. ..................... 588/204; 205/687; 205/688; 205/742; 205/746; 205/759; 204/275.1

(58) Field of Search .................................... 205/687, 688, 205/742, 746, 759; 204/275.1; 588/204

(56) References Cited

U.S. PATENT DOCUMENTS

| 5,419,816 | * | 5/1995 | Smapson et al. | 205/556 |
| 5,591,315 | * | 1/1997 | Mazanec et al. | 205/634 |
| 5,705,050 | * | 1/1998 | Sampson et al. | 205/687 |

* cited by examiner

*Primary Examiner*—Arun S. Phasge
(74) *Attorney, Agent, or Firm*—Joy Alwan; Mark Dvorscak; Paul A. Gottlieb

(57) ABSTRACT

Electrochemical incineration of p-benzoquinone was evaluated as a model for the mineralization of carbon in toxic aromatic compounds. A Ti or Pt anode was coated with a film of the oxides of Ti, Ru, Sn and Sb. This quaternary metal oxide film was stable; elemental analysis of the electrolyzed solution indicated the concentration of these metal ions to be 3 μg/L or less. The anode showed good reactivity for the electrochemical incineration of benzoquinone. The use of a dissolved salt matrix as the so-called "supporting electrolyte" was eliminated in favor of a solid-state electrolyte sandwiched between the anode and cathode.

18 Claims, 8 Drawing Sheets

ELECTROCHEMICAL MEMBRANE INCINERATOR

CONTRACTUAL ORIGIN OF THE INVENTION

The United States Government has rights in this invention pursuant to Contract No. W-7405-ENG-82 between the U.S. Department of Energy, Ames Laboratory and its contractor, Iowa State University.

BACKGROUND OF THE INVENTION

Public awareness of the discharge of industrial wastes has resulted in governmental and private development of efficient, economical and safe procedures for the destruction of toxic organic waste. Alternatives to the traditional use of thermal incineration include supercritical water oxidation, photochemical degradation, sonochemical oxidation and electrochemical incineration.

Supercritical water oxidation is performed above the critical point of water (374° C., 218 atm) in the presence of $O_2$ or $H_2O_2$. Organic species only slightly soluble in water are miscible with supercritical water. The literature contains descriptions of reaction mechanisms, kinetics and engineering aspects of supercritical water oxidation applied to numerous organic pollutants including: phenol, 1,3-dichlorobenzene and benzene, pyridine, acetic acid, 1,4-dichlorobenzene, chlorophenols, pulp and paper mill sludge, and explosives. Major reaction products are water, carbon dioxide and inorganic salts. Supercritical water oxidation is well suited for destruction of large volumes of toxic organic waste; however, for disposal of small quantities of toxic organic waste, supercritical water oxidation is not considered feasible economically. Therefore, evaluation of less costly methods is appropriate.

Recently, interest in photochemical degradation of toxic organic waste in aqueous media has expanded rapidly. The primary oxidant is the photogenerated hydroxyl radical formed on semiconductor metal oxide surfaces. Typically, $TiO_2$ powder is the semiconductor used because it is inexpensive, insoluble under conditions used in photochemical degradation, stable and non-toxic. The literature of photochemical degradation describes applications to chlorophenols, dichloroacetate and oxalate, 4-chlorophenol, humic acids, dichlorophenols, benzene, phenol, dimethoxybenzene and toluene. Applications of photochemical degradation appear most suitable for solutions having low turbidity.

Sonochemical oxidation has been used for degradation of phenol and humic acids; and of 4-chlorophenol, 3,4-dichloroaniline and 2,4,6trinitrotoluene. The primary reaction in sonochemical oxidation is the pyrolysis of solute present in bubbles generated by acoustical cavitation. Secondary reactions also occur as a result of interactions of solute with hydroxyl radicals and hydrogen atoms produced by the sonication of water.

Electrochemical incineration is an alternative to the degradation methods above described. This is a waste remediation process whereby oxygen atoms are transferred from $H_2O$ in the solvent phase to the oxidation product(s) by direct or indirect reactions on the anode surface. This procedure is attractive for low-volume applications such as confined living spaces, e.g., spacecraft, and research laboratories. The prior art has described successful electrochemical incineration of waste biomass using Pt and $PbO_2$ electrodes. The major advantages of electrochemical incineration over thermal incineration include: absence of CO and $NO_x$ generation, and low operating temperatures.

Because of the high cost of Pt and the toxicity of lead salts, two Swiss groups compared $PbO_2$ and Pt electrodes to $SnO_2$-film electrodes doped with Sb(V) ("Sb-$SnO_2$"). Both Swiss groups demonstrated that phenol is removed from aqueous solution more efficiently with Sb-$SnO_2$ anodes than with Pt and $PbO_2$ anodes. Their work also indicated that for Pt anodes, oxidation stops with the formation of small carboxylic acids, e.g., maleic, fumaric and oxalic. More recently, Pt, $IrO_2$/Ti, and Sb-$SnO_2$/Ti anodes were compared and a mechanism for the electrolysis of organic compounds was proposed. These and other descriptions of electrochemical incineration have been reviewed in the literature; advantages of electrochemical incineration include: versatility, energy efficiency, amenability to automation, environmental compatibility and low cost.

The major challenge for future development of electrochemical incineration is the discovery of nontoxic anode materials and electrolysis conditions that can achieve conversion of toxic organic waste to innocuous products with high current efficiencies. Other desirable electrode properties include low cost, lack of toxicity, high stability and high activity. The matter of current efficiency is especially pertinent because the desired O-transfer reactions require the anodic discharge of $H_2O$ to produce adsorbed hydroxyl radicals ($OH_{ads}$). However, a high surface excess of the $OH_{ads}$ species leads to evolution of $O_2$, an undesired product. Previous work has demonstrated that electrodes comprised of Fe(III)-doped β-$PbO_2$ films on Ti substrates ("Fe-$PbO_2$/Ti") are quite stable in acetate buffered media (pH 5) and offer significantly improved catalytic activity over pure β-$PbO_2$ film electrodes for conversion of $CN^-$ to $CNO^-$ under potentiostatic conditions as well as the anodic degradation of p-benzoquinone under galvanostatic conditions.

SUMMARY OF THE INVENTION

The present invention in its preferred embodiment relates to electrochemical incineration using a quaternary metal oxide consisting of a $SnO_2$ film doped with varying amounts of the oxides of antimony, titanium and ruthenium. The cathode is a porous stainless steel cylinder, and a Nafion membrane is used as a solid-state electrolyte sandwiched between the anode and cathode. Use of Nafion, a perfluorinated acid membrane, precludes the need for addition of soluble inorganic salts to function as supporting electrolytes. A dramatic increase in lifetime of the anodes has been observed to result from omission of added electrolytes. Furthermore, the low ionic strength of the electrolysis solution facilitates the use of ES-MS for determination of ionic products and there is little or no electrolyte to remove from the remediated solution.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE PREFERRED EMBODIMENT

All chemicals were reagent grade (Fisher Scientific) and water was purified in a Nanopure-II system (Barnstead, Newton, Mass.). Quaternary metal oxide films were prepared from a solution comprised of 0.4M $SnCl_2@2H_2O$, 0.03M $SbCl_3$, 0.08M $RuCl_3$ and 0.02M $TiCl_4$ in a 1:1 mixture of 12M HCl and i-propanol. This composition was chosen on the basis of patents claiming high stability for $TiO_2$-$RuO_2$-$SnO_2$ and $RuO_2$-$Sb_2O_3$-$SnO_2$ films on Ti substrates in saline solutions. p-Benzoquinone (Fisher Scientific) was purified by sublimation and used for preparation of 100 mg/L stock solutions in water. Carboxylic acids (Aldrich) were dissolved in water to prepare 1000 mg/L standard stock solutions, which were then frozen until needed to prevent microbial degradation.

Figure 1:
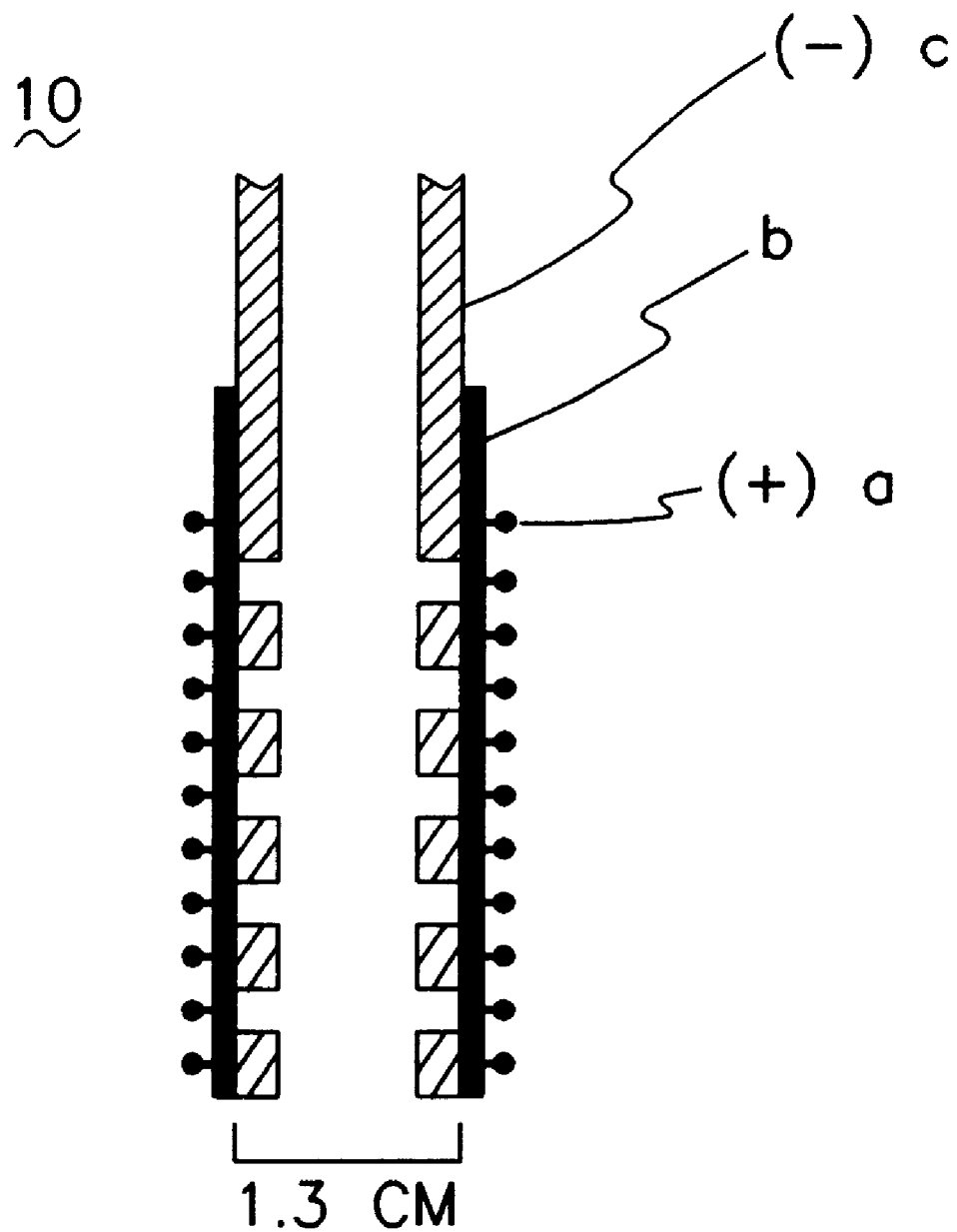
FIG. 1 is a two dimensional view of electrode assembly: (a) quaternary metal oxide film on coiled Pt anode (0.62 mm thick); (b) solid state electrolyte (0.2 mm thick); and (c) stainless steel tubular cathode (1 mm wall)

Quaternary metal oxide films were prepared by a thermal procedure in which Ti or Pt substrates were alternately painted with the solution of the four metal salts followed by heating above the flame of a Bunsen burner for ca. 15 s. After ten wetting-heating cycles, the electrode was annealed in a muffle furnace for 1 h at 600° C. The resulting quaternary metal oxide films on Ti and Pt substrates are designated here as "Ru-Ti-Sb-$SnO_2$/Ti" and "Ru-Ti-Sb-$SnO_2$/Pt", respectively. Preliminary work made use of a Ti substrate (10 $cm^2$ working area), in the form of a rectangular plate, and a Pt cathode. Subsequently, a Pt wire (0.62-mm o.d., 24-cm length, 4.7-$cm^2$ working area) was used as the substrate for quaternary metal oxide films. In the latter case, a rectangular piece of Nafion 117 membrane (2 cm×4 cm) was placed around the tubular cathode and wrapped tightly with the quaternary metal oxide-coated wire anode, as shown in FIG. 1 wherein there is shown a schematic illustration of an electrolytic cell 10 in which there is provided an anode indicated by the (=a) in the form of a wire which may be any one of a variety of composite materials or of a metal, as will be hereinafter described, which surrounds a polymer electrolyte. Preferably, the polymer electrolyte is NAFION® which is a fluorinated organic polymer having multiple pendant sulfonic acid groups. NAFION® is a trademark of the DuPont Company for a commercially available polysulfonated membrane which has the following structure as set forth in U.S. Pat. No. 4,973,391 issued Nov. 27, 1990 to Madou et al. the disclosure of which is herein incorporated by reference.

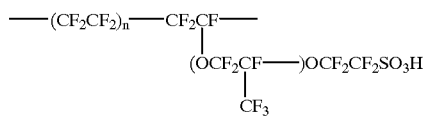

In addition, to the polymeric electrolyte denoted by letter b in FIG. 1, there is also disclosed a cathode denoted by (–c) which may be any conventional material such as stainless steel. Preferably, but not necessarily, the cell 10 is tubular in shape and more preferably cylindrical in shape, is inserted into an electrolytic solution which contains toxic organic compounds to be remediated. The anode a and the cathode c are connected to a source of energy and is applied between the cathode and the anode, the toxic organic compounds in the electrolytic solution will be remediated, as hereinafter described.

The cathode was prepared from a rod of type-360 stainless steel (6.4-mm o.d. and 3.5-cm length) drilled with 20 holes (3-mm dia.) positioned normal to the axis of the rod. Other anodes include those described by Feng et al. , J. Electrochemical soc., 138 (1991) 3328 and Electrochemical Soc. 142 (1995) 626, the disclosures of which are herein incorporated by reference.

Referring to FIG. 1, the electrolysis cell was assembled from a 50-mL three-necked pyrex flask. Teflon stoppers were machined to fit the outer two ports of the cell. One stopper allowed entry of the electrode assembly. The other stopper allowed passage of a hypodermic needle to add water or introduce a solid phase microextraction fiber for headspace analysis. A tapwater-cooled condenser was inserted in the center neck of the cell to decrease evaporative water loss during long electrolysis periods. All glassware was washed in 1M KOH in a 1:1 mixture of ethanol and water, then in 2M $H_2SO_4$, then rinsed with water and then dried overnight at 100° C.

The power supply was a potentiostat/galvanostat (model 363, EG&G Princeton Applied Research, Princeton, N.J.) operated in the galvanostatic mode.

Electrolyses were performed under galvanostatic control at 1.0 A (ca. 0.2 A/$cm^2$) on 50-mL aliquots of benzoquinone stock solution. At the conclusion of each lectrolysis, deionized water was added to bring the volume in the cell back to 50 mL, i.e., the starting volume.

The elemental content of the initial benzoquinone solution and one that had been electrolyzed for 64 h was determined by inductively coupled plasma-mass spectrometry (ICP-MS). The apparatus and typical operating conditions have been described in the prior art. A semiquantitative analysis mode was used for calibration. Spectral scans were measured in separate m/z windows typically 50 daltons wide. Analyte signals were adjusted for blank signal, isotopic abundance and approximate degree of ionization and then compared to those for known concentrations of Co, La or Tl, whichever was in the particular m/z window of interest. Scans of the full m/z range showed that matrix effects were negligible.

In addition to the starting solution, samples representing eight electrolysis periods in the range 0.5–64 h were analyzed for TOC, COD, pH, and inorganic and organic anions. TOC was determined at the University of Iowa's Hygienic Laboratory, which is EPA approved. Samples were analyzed by a DC190 TOC Analyzer (Dohrmann, Santa Clara, Calif.) using a combustion infrared method. COD was determined by titration with $KMnO_4$ as known in the art or by a Hach DR2000 analyzer (Loveland, CO).

Quinone and phenolic compounds were separated with a reverse phase Zorbax SBC18 column (25-cm length, 4.6-mm dia.) developed by Rockland Technologies (Chadds Ford, Pa.) and detected by absorption at 240-nm using a Kratos Analytical Spectroflow photometer (Ramsey, N.J.) or with a Perkin-Elmer SCIEX API/1 ES-MS (Thornhill ON, Canada) based on a single quadrupole mass spectrometer. The ES-MS was equipped with a Perkin-Elmer SCIEX Turbolon Spray heating probe (Thornhill ON, Canada). The TurbolonSpray employs a heated gas flow near the electrospray needle which increases evaporation of solvent and allows liquid flow rates up to 1 mL/min. TurbolonSpray eliminates the need to split the eluent stream from the HPLC, eliminates some background peaks, improves detection limits where background peaks are eliminated, and allows use of low organic solvent levels. Methanol and water at a 1:1 ratio was the eluent used at a flow rate of 0.3 m/min. In addition, inorganic and organic anions in the electrolysis solutions were monitored by direct infusion into the ES-MS. Carboxylic acids were identified using an ICE-AS6 ion-exclusion column from Dionex (Sunnyvale, Calif.) coupled to ES-MS as known in the art.

The inorganic and organic anions were quantified using an AS11 anion-exchange column with an ED40 conductivity detector from Dionex. A sodium hydroxide and methanol gradient elution program as described in the literature accompanying the column provided the needed separation of the analytes of interest.

Polyacrylate and carbowaxdivinylbenzene coated SPME fibers from Supelco (Bellefonte, Pa.) were used to extract constituents in the benzoquinone solution and in the headspace. Solid phase microextraction fibers underwent thermal desorption in a Varian 3400 gas chromatograph (Palo Alto, Calif.) equipped with a DB-1 or DB-5 column from J&W Scientific (Folsom, Calif.), and coupled to a Finnigan TSQ-700 triple quadrupole mass spectrometer (San Jose, Calif.).

Aldehydes and ketones were collected with Sep-Pak (DNPH-Silica) cartridges manufactured by Waters Chromatography (Marlborough, Mass.). The HPLC analysis of the eluent in the Sep-Pak cartridges was performed as described in the manufacturer's instructions accompanying the cartridges.

Table 1 presents a comparison of the performance of seven electrode materials applied for anodic degradation of benzoquinone in acetate buffer. Included are values of COD following electrolysis for specified time periods and brief comments pertaining to the electrolysis solution or the electrode surfaces. The COD in these solutions was determined by titration with standard $KMnO_4$, a procedure that ignores contribution from the acetate/acetic acid components. The Au anode was least effective, requiring 48 h to decrease the COD to 582 mg/mL, i.e., a 46% decrease from the original value. The Ru/Ti anode was slightly more effective than Au with a COD of 28 mg/L after 48 h. The $PbO_2$/Ti anode decreased the COD to 12 mg/L after 24 h; however, the Fe-$PbO_2$/Ti anode decreased the COD to 8 mg/L after only 10 h. The Ru-Ti-Sb-$SnO_2$/Ti anode was somewhat less efficient than the Fe-$PbO_2$/Ti anode, producing a COD of 6 mg/L after 24 h. The glassy carbon anode exhibited significant degradation within 10 h and corrosion of the Ti surface in the Sb-$SnO_2$/Ti anode was observed after only 0.5 h.

Comments are frequently offered by environmentalists that use of toxic lead-based anodes is not acceptable for electrochemical incineration applied to potable waters. Therefore, even though Ru-Ti-Sb-$SnO_2$/Ti anodes were slower to oxidize benzoquinone than Fe-$PbO_2$ anodes, the former are preferred.

TABLE 1

Comparison of values for chemical oxygen demand (COD) and current efficiency achieved with seven electrode materials for the electrochemical incineration of 50 mL of 10 mM benzoquinone in acetate buffer.

| Electrode (10 $cm^2$) | Current (mA/$cm^2$) | Time (h) | $COD^a$ (mg/L) | Observations |
|---|---|---|---|---|
| None | n.a. | 0 | 1071 | Brown-black solution. |
| Au | 10 | 48 | 582 | Deep yellow solution. |
| Ru/Ti | 10 | 48 | 28 | Yellow solution. |
| Glassy carbon | 10 | 10 | — | Carbon particles suspended in solution. |
| $PbO_2$/Ti | 10 | 24 | 12 | Colorless solution. |
| Fe—$PbO_2$/Ti | 10 | 10 | 8 | Colorless solution. |
| Sb—$SnO_2$/Ti | 10 | 0.5 | — | Apparent corrosion of Ti substrate. |
| Ru—Ti—Sb—$SnO_2$/Ti | 10 | 24 | 6 | Colorless solution. |

[a]COD determined by titration with $KMnO_4$.

Quaternary metal oxide films corroded slowly when operated at large current densities (100 mA/$cm^2$) and ambient temperatures (25–35° C.). The U-tube shape of the Ru-Ti-Sb-$SnO_2$/Ti anode permitted circulation of thermostated water. With this electrode, the quaternary metal oxide films exhibited less corrosion when operated at higher temperature. Typically, corrosive losses were not visible nor detectable by gravimetry following 70-h electrolysis periods when the Ru-Ti-Sb-$SnO_2$/Ti tubular anode were operated at 200 mA/$cm^2$ and 60° C. The observed benefit from a higher operating temperature is not understood; however, it is known in the art that increased temperature increases the rate of water discharge and, therefore, causes the anode potential to be decreased.

A freshly prepared quaternary metal oxide film on Ti that had not been used for electrolysis was examined by scanning electron microscopy. The micrograph indicated a moderately uniform film corresponding to an aggregation of small crystallites with individual diameters <2 μm. The results of energy dispersive spectroscopy for this surface confirmed the presence of Sb, Ru, Ti and Sn. An elemental analysis of two different regions of the electrode surface yielded the following percent compositions: Sb=7 and 8%, Ru=9 and 9%, Ti=10 and 21%, and Sn=34 and 39%. In comparison, the relative concentrations of metallic components of the solution used for thermal preparation of quaternary metal oxide films were: Sb=6%, Ru=14%, Ti=3% and Sn=77%.

The Nafion membrane eliminated the need for added soluble salts to serve as supporting electrolytes, which facilitated direct analysis of product solutions using ES-MS. These analyses can only be performed on solutions of low ionic strength to prevent build-up of salt deposits that plug the orifice cone in the ES-MS. The Nafion 117 membrane also prevented film formation on the anode surfaces during electrochemical incineration of 10 mM benzoquinone solutions over periods of several weeks. The prior art has reported formation of organic films on Pt electrodes applied for anodic degradation of phenol and stated that film formation was exacerbated by high pH, low current density, high temperature and high phenol concentrations. Similar problems of film formation with loss of electrode activity have been encountered in this laboratory during amperometric detection of phenol at Pt electrodes and electrolysis of benzoquinone at Pt, but the latter has yet to be published.

Construction of electrolysis cells using a solid-state electrolyte requires that the membrane be sandwiched tightly between porous anode and cathode materials. Undoubtedly, for applications to solutions having zero ionic strength, i.e., very low conductivity, electrolysis occurred only on those small portions of the electrode surfaces that were in simultaneous contact with solution and membrane. The result was a severely attenuated working area of the electrodes with a corresponding increase in the effective current density. We observed cell voltages >10 V as compared to <5 V for the presence of acetate buffer (pH 5).

Whereas this loss of effective electrode area, with a resulting increase in cell voltage, is seen as a disadvantage of this cell design, it is probably the explanation for the absence of organic film build-up on our anode surfaces. The higher effective current density resulted in an elevated rate of $H_2O$ discharge at the working portions of the anode with a corresponding large flux density for OH radicals that are believed to be the source of O-atoms transferred to the product(s) of the electrochemical incineration reaction(s). Therefore, the lifetime of organic radicals was greatly diminished with the beneficial decrease (or elimination) of radical polymerization to form surface films. The smell of $O_3(g)$ also was detected above the electrode assemblies constructed with the Nafion membranes. This has been reported and can be expected when high current densities are applied at noble electrodes. It is not known to what extent the evolution of some $O_3$ assists in promoting the desired electrochemical incineration.

A disadvantage of using the solid-state electrolyte in place of added soluble electrolyte was a significant increase in the electrolysis time needed to decrease COD values to specified levels. For example, addition of 0.1M acetate buffer (pH 5) to our cell resulted in a ca. 50% decrease in time required to achieve >90% decrease in COD.

Figure 2:
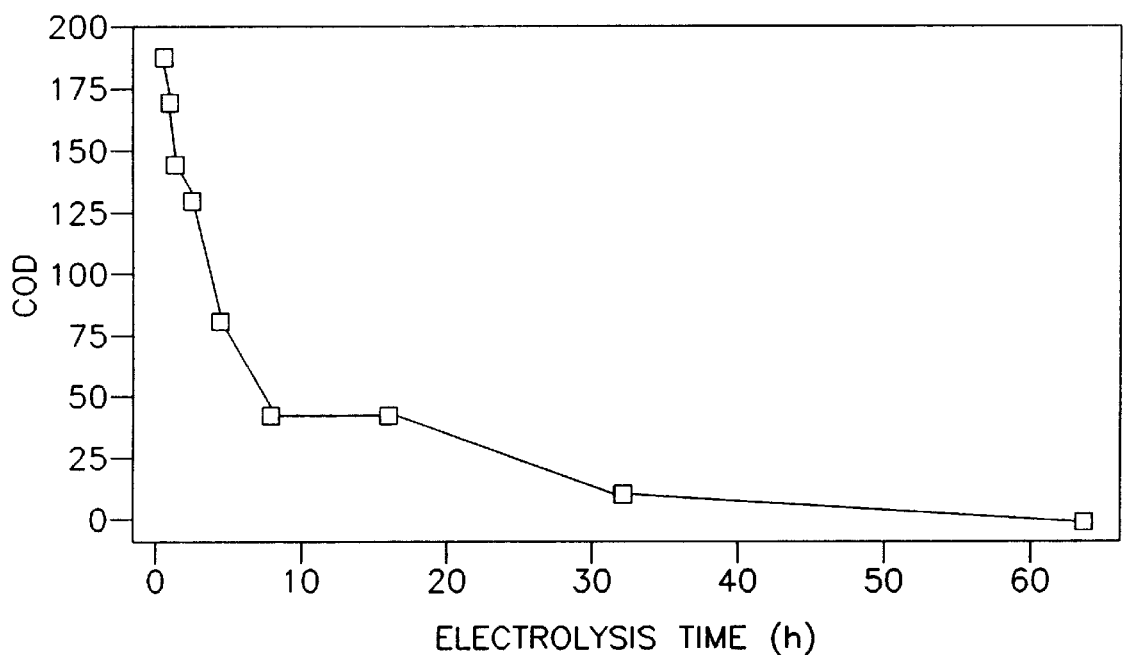
FIG. 2 illustrates graphical plots of COD and pH vs. time during electrochemical incineration of 100 mg/L benzoquinone using a Pt anode covered with the quaternary metal oxide film.
Figure 2:
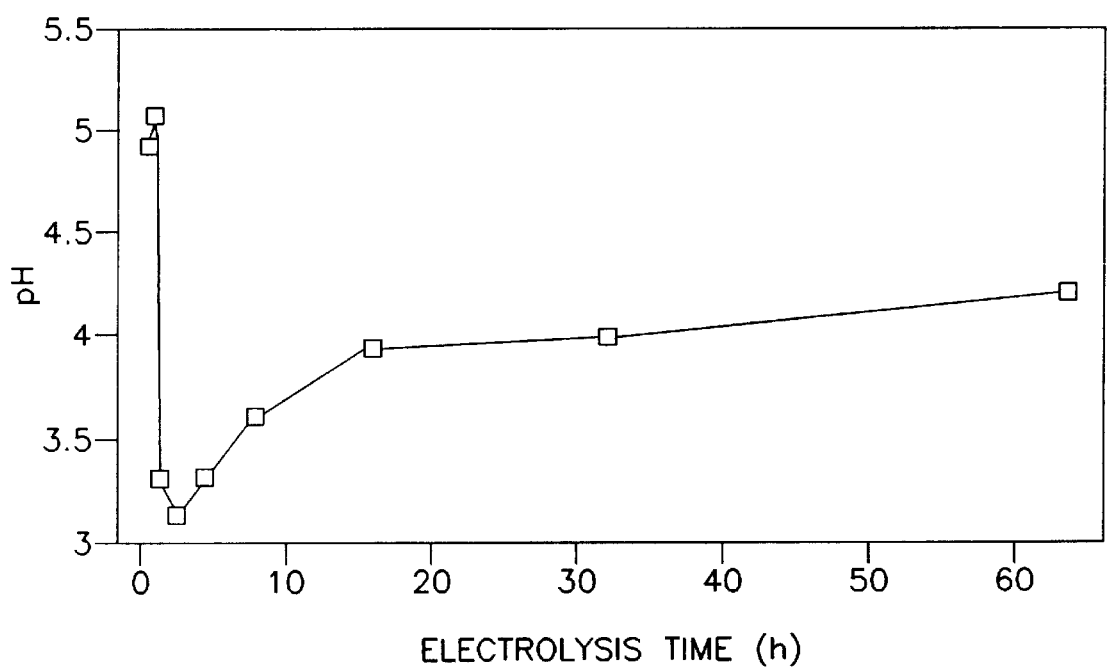

FIG. 2 contains plots showing the change in COD and pH as a function of electrolysis time during the electrochemical incineration of a solution containing 100 mg/L benzoquinone. Values for COD, obtained with the Hach DR2000, steadily decreased from an initial value of 190 mg/L to 2 mg/L during a 64-h electrolysis period. Values of TOC (not shown) decreased to 1.2 mg/L during this same period. The pH of the electrolysis solution decreased sharply to a minimum of ca. 3 at 2 h followed by a gradual increase to a final value of ca. 4. Whereas the rate of $CO_2$ evolution is maximum immediately following the onset of electrolysis, ionization of the resulting $H_2CO_3$ ($pK_{a,1}$=6.3) is not sufficiently strong to explain the sharp drop in pH. The most probable explanation is the formation of carboxylic acids by the first steps in benzoquinone degradation. The prior art reports the presence of maleic, fumaric and oxalic acids following electrolysis of phenol solutions.

Benzoquinone is very reactive in water and undergoes condensation reactions. The identity of these condensation products is highly dependent upon starting concentration and pH. Products include dibenzofuran, biphenols, a trimer of molecular weight (MW) 290, plus a higher MW polymer. Condensation occurs rapidly in alkaline media but only slowly in neutral and acidic media. Following addition of benzoquinone to pure water, the color of the solution changes from light yellow to a tea color within 72 hrs and to coffee brown within one week. Because a similar color transition is observed during the initial phase of the electrochemical incineration of benzoquinone, an attempt was made to look for the compounds named above. None of these compounds was detected using a solid phase microextraction fiber in combination with GC-MS for a 10 mM benzoquinone solution.

In the electrolysis solutions (100 mg/L benzoquinone), only hydroquinone and resorcinol were detected on the solid phase microextraction fibers even though the sensitivity for phenols was increased by derivatization with acetic anhydride. Derivatization was not performed on the 10 mM benzoquinone solution. Results obtained using the polyacrylate fiber during electrolysis were consistent with the presence of hydroquinone and resorcinol following 0.5, 1 and 2 h. At 4 h, hydroquinone was not detected and at 8 h, resorcinol was not detected.

ES-MS was also used to look for dibenzofuran, biphenols and other phenolic compounds. Although ES-MS could detect these compounds in standard solutions, dibenzofuran and biphenols were not observed before or during the electrolysis of solutions containing 100 mg/L or 10 mM benzoquinone. However, phenol was detected in a stock solution of week-old 10 mM benzoquinone that had not undergone electrolysis.

Figure 3:
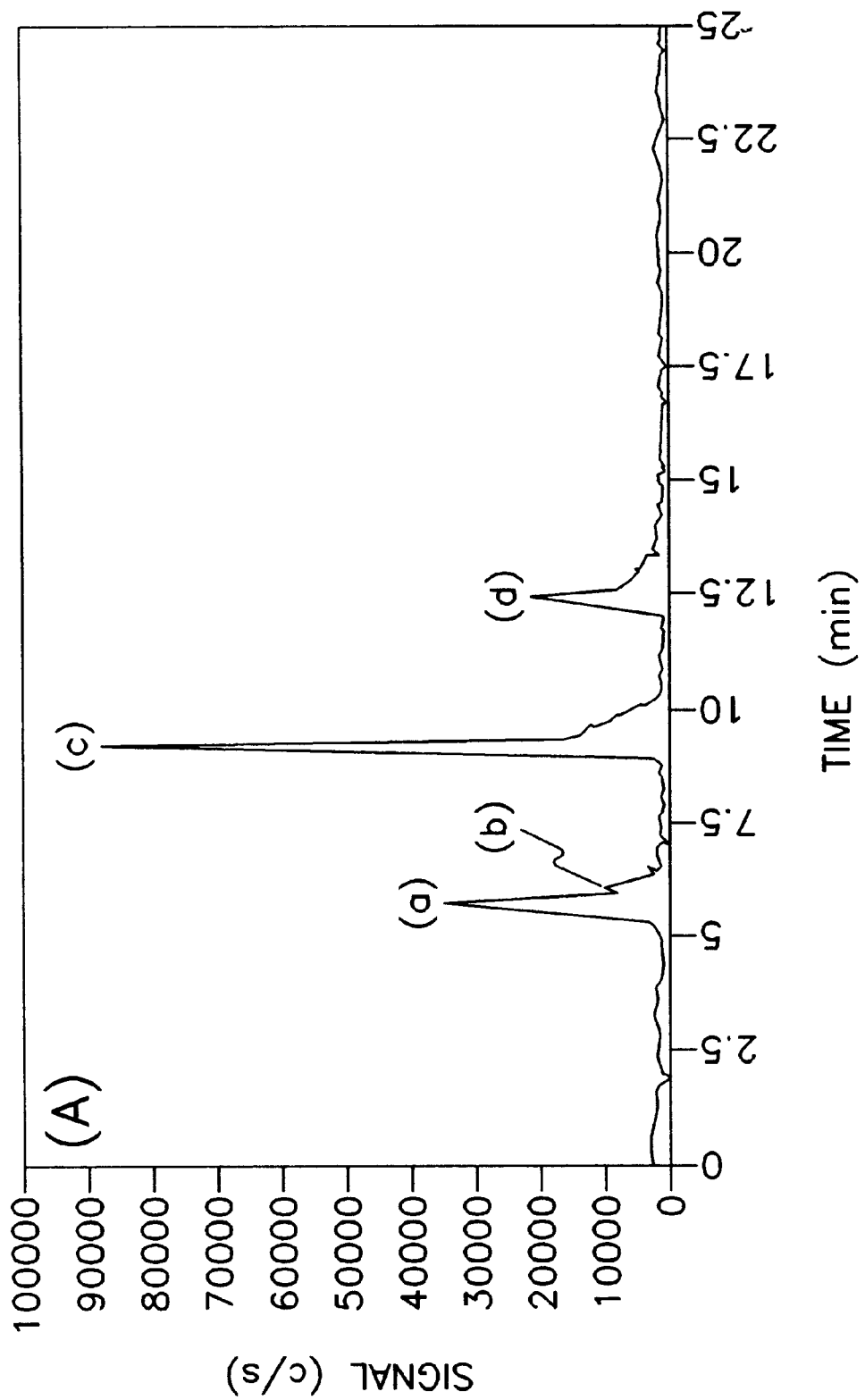
FIGS. 3 and 4 are graphs showing the total ion signal in LC-ES-MS obtained for (A) a 1-h electrolysis solution of 100 ppm benzoquinone and (B) a standard solution.

ES-MS identified p-benzoquinone and hydroquinone in electrolysis solutions at #4 h. Chromatograms are compared in FIG. 3 for a benzoquinone solution after 1 h of electrolysis (A) and a standard solution (B). In addition to the standards shown in the chromatogram, selected ion monitoring was used to look for 2-hydroxybenzoquinone. The prior art has shown that benzoquinone in dilute aqueous solution was converted to hydroquinone and 2-hydroxybenzoquinone via a benzene-1,2,4-triol intermediate product. A peak was not seen in the chromatogram for 2-hydroxybenzoquinone but a signal was obtained at m/z=123 whenever benzoquinone or hydroquinone were eluted from the column. 2-Hydroxybenzoquinone was not commercially available and was too unstable to be synthesized and stored. However, 2,5-dihydroxybenzoquinone was detected by ES-MS.

Because resorcinol was detected in the electrolysis sample by the solid phase microextraction method but not when using ES-MS, resorcinol might have formed in the sample preparation step of the microextraction method. A high pH was required for the derivatization with acetic anhydride and benzoquinone is very reactive under these conditions. Another possible explanation is that the solid phase microextraction method was more sensitive to resorcinol than LC-ES-MS.

The Zorbax SBC18 HPLC column works well for the separation of phenols in conjunction with ES-MS. One method of separating phenols is ion suppression chromatography which uses a phosphate buffer (pH 4) to suppress ionization. Phosphate buffers are known to suppress the ES-MS signal. Methanol and water are commonly used as a solvent for ES-MS analyses; fortunately the SBC18 column retained the phenols with only this eluent. Because detection limits improve as column diameter decreases, the use of a SBC18 column (3-mm i.d.) was tested to improve the sensitivity of the analytical technique. However, resolution between hydroquinone and its isomers was lost unless trifluoroacetic acid was added to the eluent at such a high concentration that signal suppression occurred in the ES-MS. Detection limits for HPLC-ES-MS of phenols were as follows: hydroquinone and benzoquinone=100 µg/L, phenol and 2,5-dihydroxybenzoquinone=300 µg/L, and resorcinol and pyrocatechol=50 µg/L. When the same chromatographic conditions were coupled to an absorbance detector, the limits of detection for all six compounds were ca. 20 µg/L.

Table 2 shows the acidic intermediate products detected during the electrochemical incineration of 100 mg/L benzoquinone. The major identified intermediate products were formic, acetic, maleic, succinic and malonic acids. Maleic acid concentrations peaked at 2 h and, by 8 h, had decreased to <500 µg/L. The presence of succinic, malonic, acetic and formic acids persisted after 32 h of electrolysis. Fumaric acid was detected in the first 4 h of electrolysis; however, concentrations were always less than 500 µg/L. The inorganic anions chloride and sulfate were present as impurities in the starting solution (#1 mg/L). As a result of the anodic oxidation of chloride, chlorate was found in most electrolysis solutions at low levels (ca. 500 µg/L). Because the detection limit for perchlorate was ca. 5 mg/L with the anion-exchange column, it could not be detected with the conductivity detector. However, perchlorate was detectable by ES-MS in all samples after ca. 4 h at concentrations estimated to be <5 mg/L.

TABLE 2

Acidic intermediates identified in the product solution during electrochemical incineration of benzoquinone.

| Compound | Peak Concentration (mg/L) | Electrolysis Time (h) |
| --- | --- | --- |
| p-Hydroquinone | 1 | 1 |
| Formic acid | 5 | 0.5 |
| Fumaric acid | <1 | 0.5 |
| Maleic acid | 9 | 2 |
| Malonic acid | 1 | 8, 16 |
| Succinic acid | 10 | 8 |
| Acetic acid | 8 | 64 |

It was not possible to identify all of the ions detected by direct infusion of the sample into the ES-MS. Because of the numerous reactions occurring in the electrolysis solution and fragmentation and clustering occurring in the electrospray ionization process, the interpretation of these data was difficult and necessitated the coupling of the ES-MS with LC.

Figure 4:
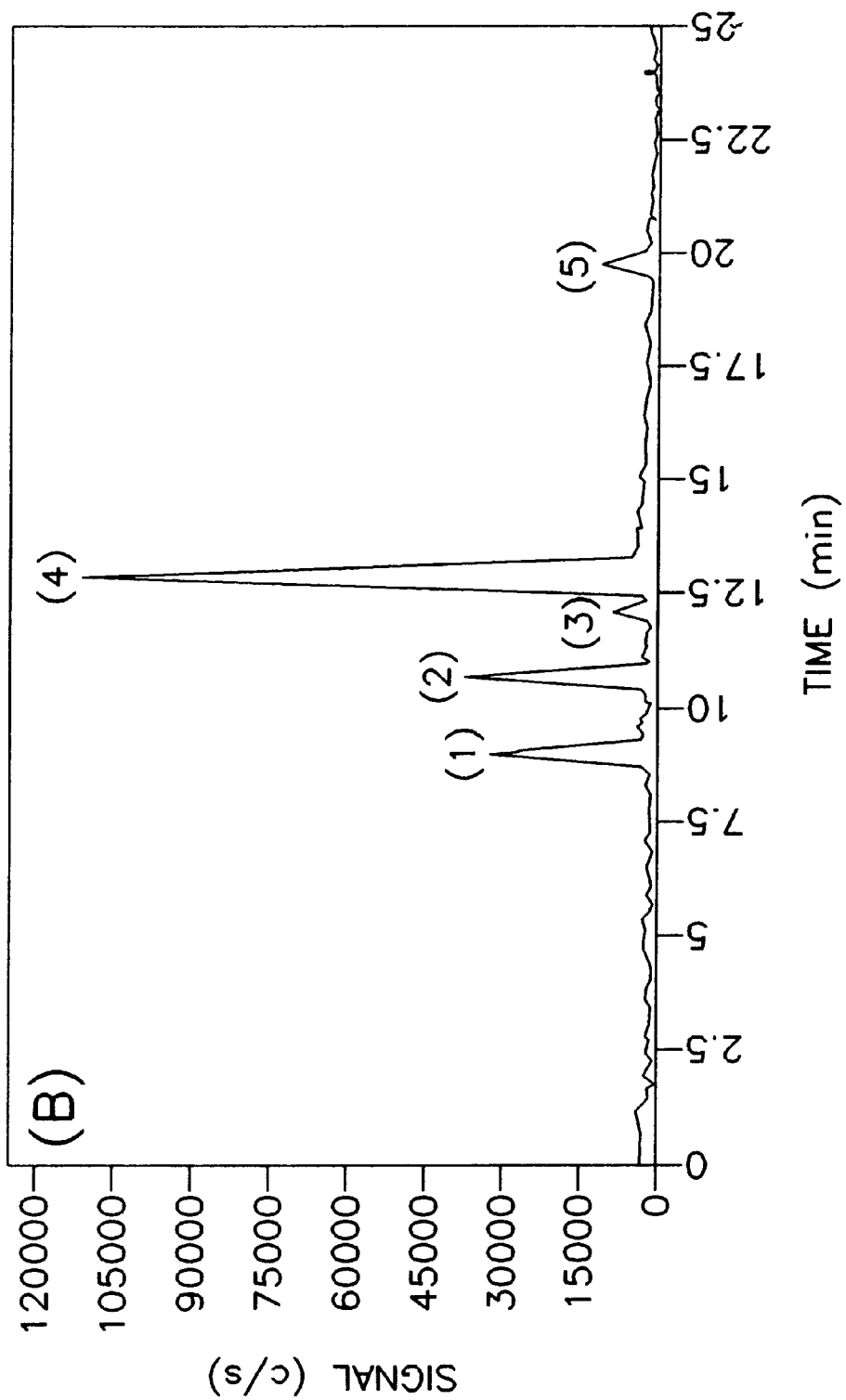

A Dionex AS11 anion-exchange column with a conductivity detector was used to quantify the anions listed in Table 2. Fifteen peaks were detected and a typical chromatogram is shown in FIG. 4. Because more peaks could be detected with the anion exchange column than with the ion exclusion column using ES-MS detection, the identities of all peaks shown in FIG. 4 have not been established. The anion-exchange column could not be coupled with ES-MS because the sodium hydroxide eluent was not compatible with ES-MS. Using LC-ES-MS, acetic acid, formic acid, chloride, succinic acid, malonic acid, maleic acid, fumaric acid and sulfate were identified. Fumaric acid was quantified using LC with absorbance detection.

Figure 5:
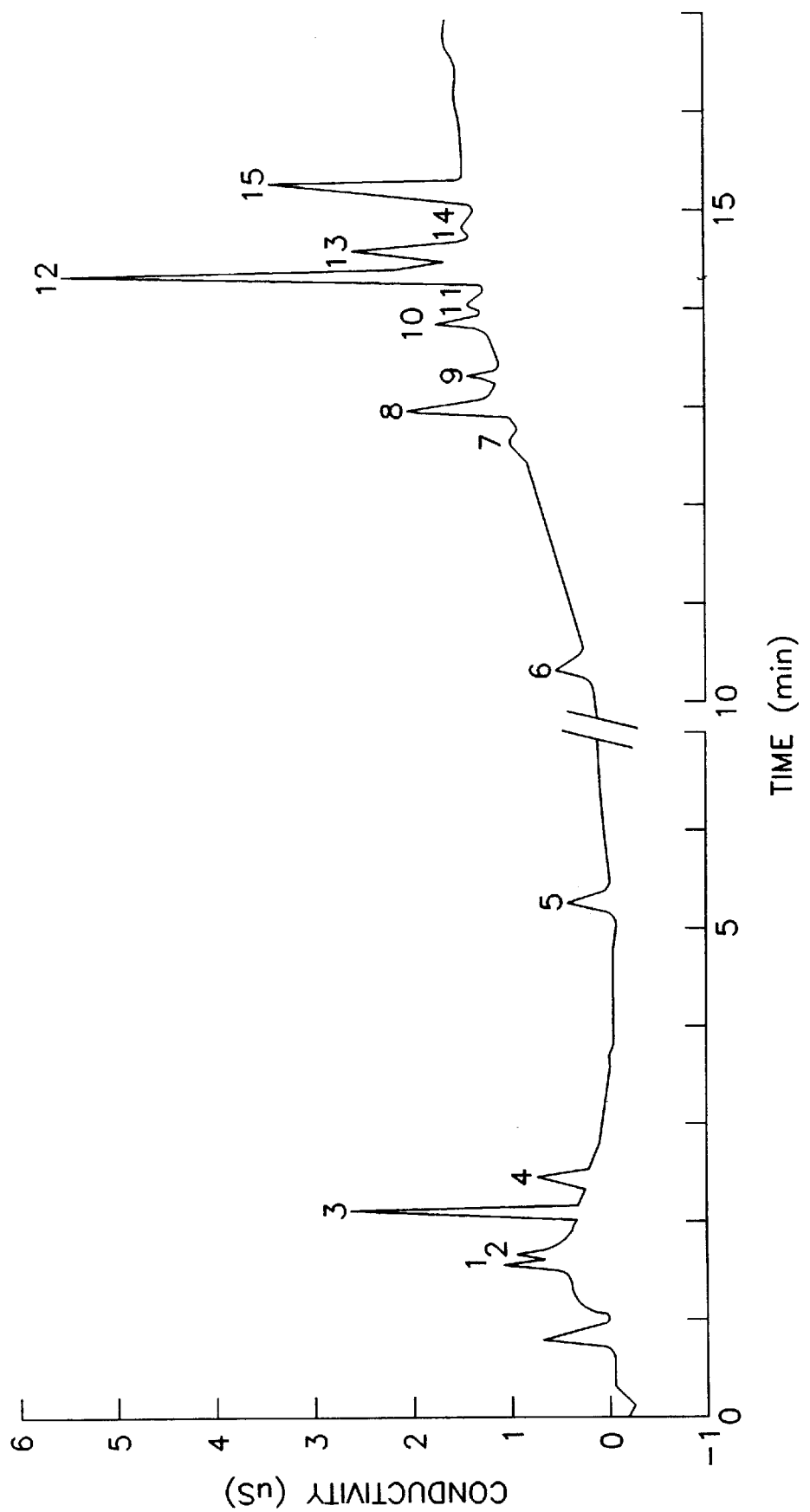
FIG. 5 is a graphical illustration of the chromatogram of 100 mg/L benzoquinone solution after a 2-h electrolysis period using an anion exchange column with conductivity detection.

FIG. 5 compares remediation rates for four compounds generated during electrochemical incineration of benzoquinone. Whereas benzoquinone and maleic acid quickly undergo a redox reaction in the electrolysis solution, succinic and acetic acids were only slowly oxidized by electrochemical incineration. At 64 h, acetic acid was the only significant organic compound remaining in solution. Malonic acid levels were never higher than 1 mg/L and, therefore, it is apparent that malonate is oxidized more rapidly than either succinate or acetate. Formic acid levels gradually dropped throughout the course of the electrolysis from 5 mg/L in the solution electrolyzed for 0.5 h.

The first attempt to analyze the gas phase above the benzoquinone solution during anodic oxidation was to measure the yield of $CO_2$ using Pt mesh electrodes and compare the $CO_2$ yields with that from the thermostatically controlled Ru-Ti-Sb-$SnO_2$/Ti tubular anode. The tubular electrodes were previously known. Concentrations of $CO_2$ were determined gravimetrically and yields with Pt mesh electrodes were 63% without use of an antifoam and 72% with an antifoam. Carbon dioxide yields using the quaternary metal oxide tubular electrodes were 74% for electrolysis periods in the range 48–72 h. As stated earlier, there was evidence that some of the organic intermediate products were swept out of the solution by co-evolution of $CO_2$ and $O_2$ with the result of $CO_2$ yields <100%.

Results from analysis of the headspace above the coiled electrode assembly using the solid phase microextraction fiber indicated the presence of acetaldehyde and benzoquinone. Therefore, Sep-Pak cartridges were used to quantify aldehydes and ketones emitted from the electrolysis solution. The Sep-Pak cartridges concentrated aldehydes and ketones from the gas stream. After a 48-h electrolysis period, <1% of the carbon in benzoquinone appeared to have been oxidized to acetaldehyde and acetone. No formaldehyde was detected in the gas stream.

Because some of the small carboxylic acids generated by electrolysis are volatile, the condenser above the electrolysis cell was rinsed to see if any acids might adhere to it. Indeed, small peaks for acetic and formic acids were obtained using absorbance detection; however, no attempt was made to quantify these acids.

Conceivably, metals from the quaternary metal oxide film, the Pt substrate, or the stainless steel cathode could be dissolved into the product solution. This is an issue of concern in consideration of metal oxide films for remediating organic waste solutions. Therefore, the elemental content of a benzoquinone solution after a 64-h incineration period at a well-used electrode was determined by ICP-MS. The estimated concentrations (µg/L) are: Ti=0.5, Cr=0.5, Mn=1, Ni=3, Zn=32, Ru=2.4, Sn=1, Sb=1 and Pt=0.6. The concentrations determined following electrolysis using a newly-prepared electrode ranged from ten to one hundred times larger than those values reported here for a well-used electrode.

Chromium, Sn and Pt are elements of major environmental concern and these were present at very low levels (0.5–1 µg/L). The count rates for the Fe peaks at m/z=54 and 56 were approximately the same as for the unremediated blank and, therefore, virtually no Fe dissolved from the stainless steel counter electrode during electrolysis.

Figure 6:
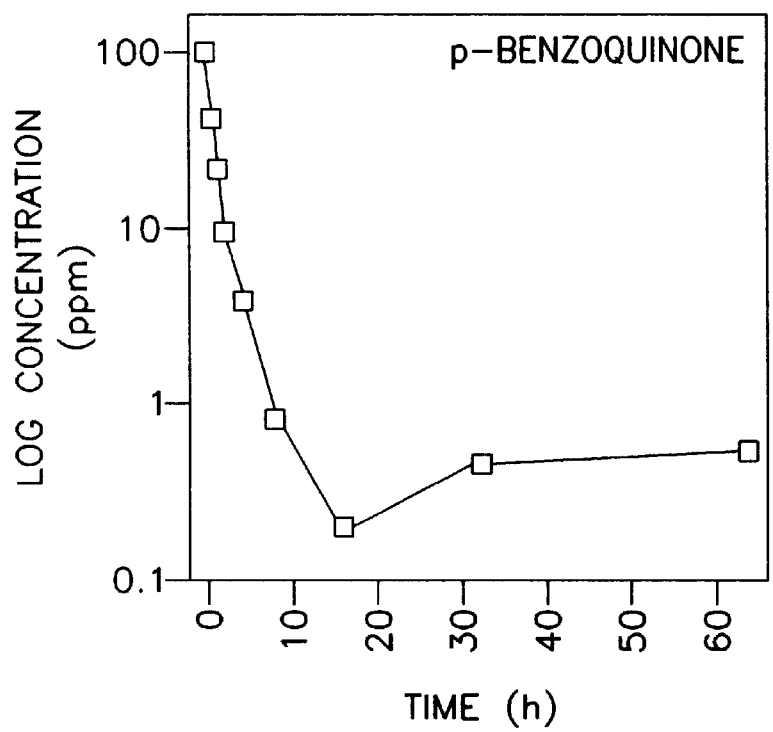
FIGS. 6 and 7 contain graphical charts showing the change in concentration of selected reaction products vs. electrolysis time using a Pt anode covered with the quaternary metal oxide film, Nafion membrane, and porous stainless steel cathode.
Figure 6:
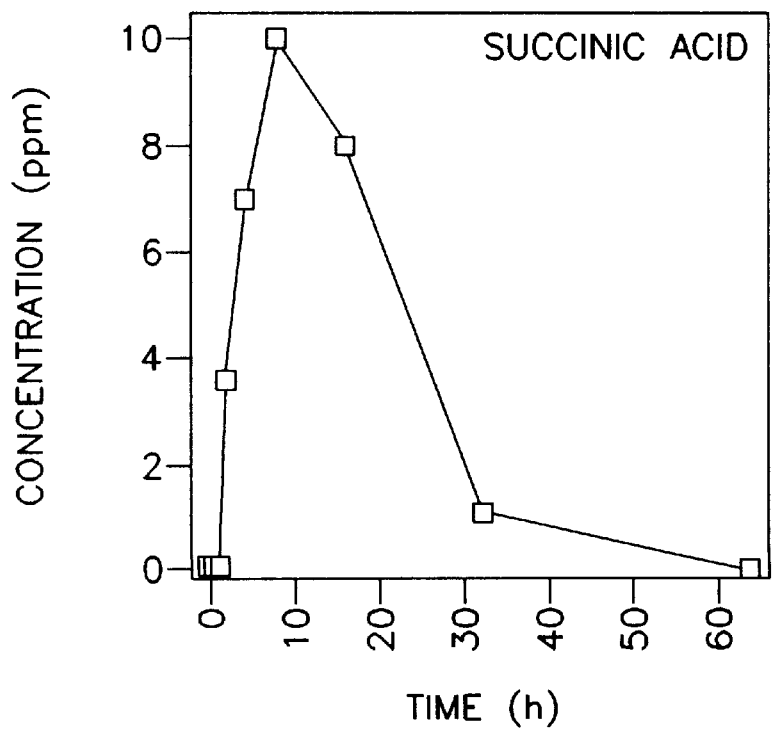
Figure 7:
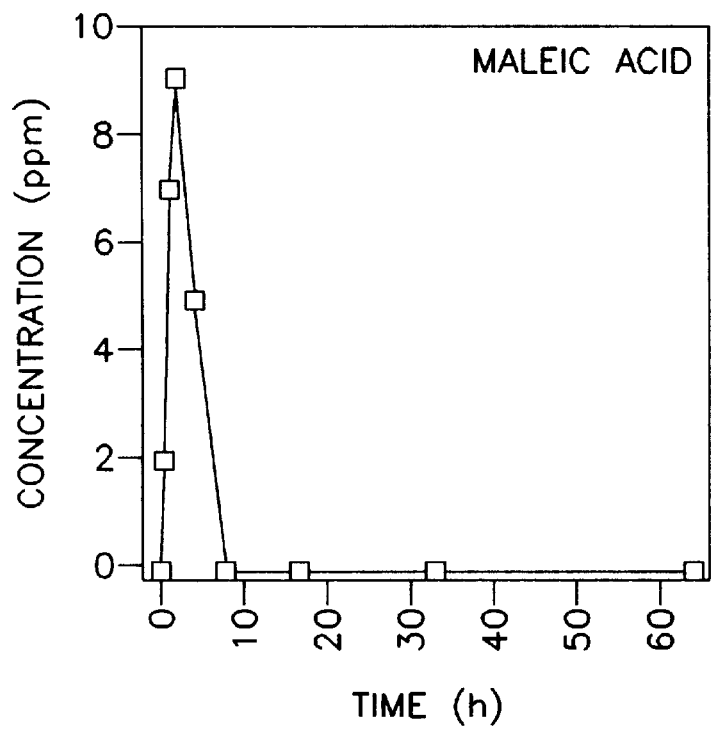
Figure 7:
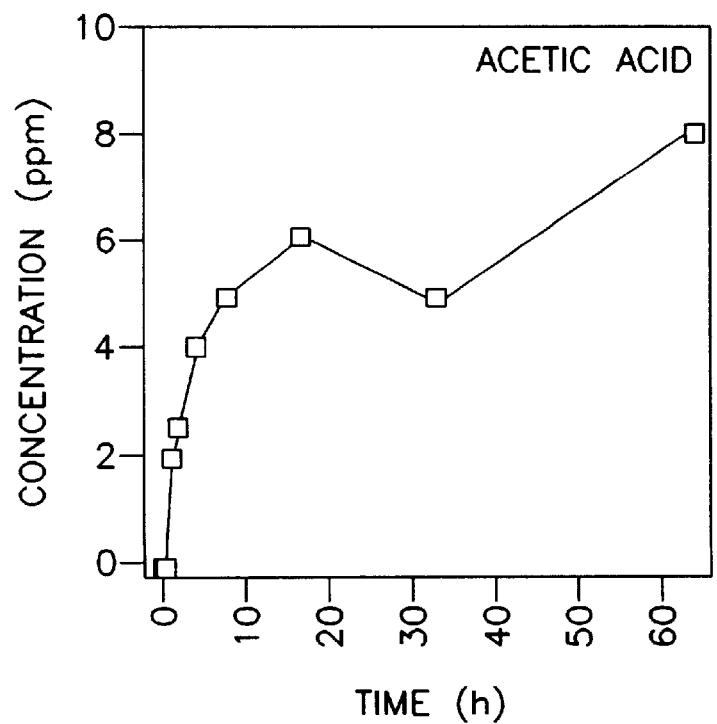
Figure 8:
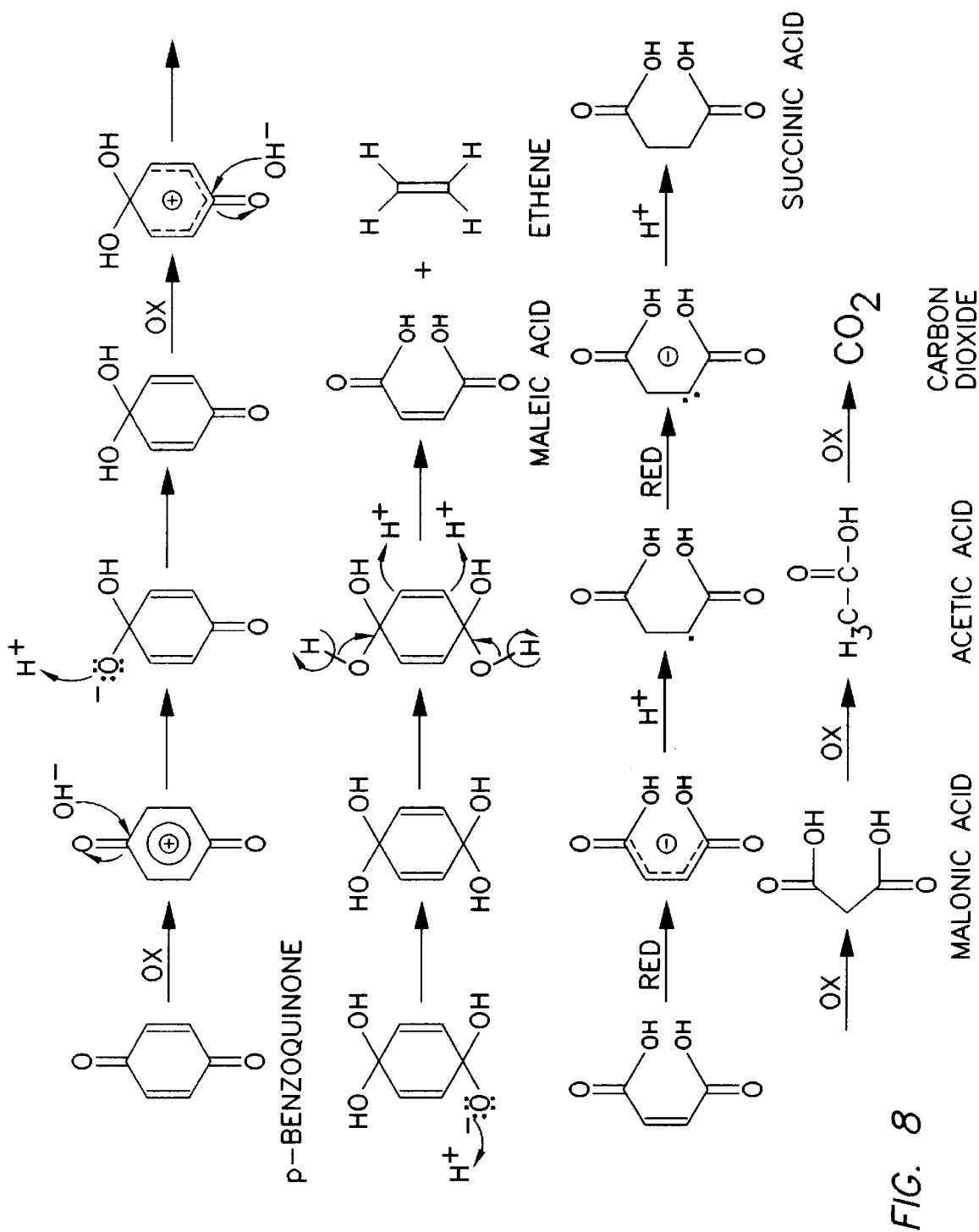
FIG. 8 are formulations showing the suggested reaction pathway for the electrochemical incineration of benzoquinone at a Pt anode covered with the quaternary metal oxide film.

FIG. 6 is a possible mechanism for the oxidation of benzoquinone to maleic acid. If benzoquinone is absorbed onto the electrode surface and gives up an electron, a neighboring adsorbed OH radical then attacks the benzoquinone. If this process repeats itself at the para position, the ring could open to form maleic acid and ethene. No ethene was detected in the headspace analysis; however, it has beeni reported that ethene is oxidized to $CO_2$ at Pt but oxidized to acetaldehyde, acetone and propionaldehyde on Au or Pd electrodes.

The mechanism in FIG. 6 suggests that maleic acid is reduced to succinic acid at the cathode followed by oxidation to malonic and acetic acid at the anode. The occurrence has been reported on the electroreduction of maleic and fumaric acids to succinic acid at a lead cathode. We found an electrolysis of succinic acid resulted in the appearance of malonic acid followed by acetic acid. The prior art reports that alcohols can be oxidized to the corresponding carboxylic acids if the reactants are not reduced at the cathode. It is possible that use of divided cells to prevent access of maleic acid to the cathode might decrease the time for total electrochemical incineration.

Quaternary metal oxide films applied to Ti or Pt substrates exhibited high and persistent activity as anode materials for the electrochemical incineration of benzoquinone. Use of a Nafion membrane, sandwiched between the anode and cathode, eliminated the need for addition of soluble salts and, thereby, permitted product solutions to be analyzed by ES-MS. However, the low ionic strength of the solutions resulted in a substantial decrease in the working area of the electrodes with a corresponding increase in the electrolysis period needed to bring the COD effectively to a zero value.

Numerous ionic intermediate products formed during the electrochemical incineration of benzoquinone were identified and quantified. The major intermediate products identified were p-hydroquinone, formic acid, fumaric acid, maleic acid, malonic acid, succinic acid and acetic acid.

A distinct advantage of using the solid-state electrolyte in large-scale applications of electrochemical incineration is the production of a final product which is essentially pure water that can be disposed into sanitary sewage systems without the need for desalting or pH adjustment.

In general, the anode may be formed of a relatively inert metal such as Pt, Ir, Au, Pd or Ti or the alloys thereof. Alternately, the anode may be a composite in which there is a metal substrate having thereon an oxide of a variety of materials to enhance the efficiency and operation of the anode substrate. For instance, the anode may be a composite which includes a substrate selected from Sn, W, Zr, Ta, Ir, Pd, Pt, Ti, Au, Cu alloys, Ru, C and Ag thereof. Most preferably, the anode substrate if it is to be combined with an oxide enhancing material is selected from Sn, Pt, Ti, Cu, Cu-Ag alloys, Ru and Ag. Various oxides are used to enhance electrical properties, chemical reactivity of properties, chemical reactivity of the anode material with respect to the toxic organic compounds in the electrolysis solution and to provide adhesiveness of the outside layer to the substrate. More particularly, antimony oxide is a good material to enhance the electrical conductivity in a composite anode and Ru oxides are good materials to enchance the chemical activity of a composite anode. In addition to the oxides of Ru, the oxides of the transition metals may be substituted for Ru to enhance the chemical activity of the oxide matrix on the metal substrate in a composite anode. Preferably, the oxide of the substrate metal is used to increase the adhesiveness of the oxide material to the substrate metal. For instance, if the substrate metal is Ti, then the preferred oxide to increase the adhesiveness of the oxide material in the composite anode is Ti oxide.

In the preferred embodiment, the Sn oxide was used as a matrix for the Ti, Ru and Sb oxides. Moreover, a potential is normally applied across the anode and the cathode, but a well recognized alternative is to pass a controlled current through the electrolysis cell, and it is intended that both methods are to be included by reference to applying a potential across the anode and cathode.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A method of electrolytically remediating toxic organic compounds present in an aqueous medium forming an electrolysis solution, comprising inserting an electrolytic cell into the electrolysis solution; exposing the toxic organic compound in the electrolysis solution to the electrolytic cell comprising a cathode and an anode separated by a perflurorosulfonic acid membrane therebetween, and applying a potential across the anode and cathode for a time sufficient to remediate the toxic organic compounds present in the electrolysis solution.

2. The method of claim 1, wherein the membrane has no component soluble in the aqueous medium forming the electrolysis solution.

3. The method of claim 1, wherein the anode is a metal of Pt, Ir, Au, Pd, Ti or the alloys thereof.

4. The method of claim 1, wherein the anode is a composite of a metal substrate and the oxides of two or more compounds enhancing the electrical conductivity and chemical activity of the metal subtrate.

5. A method of electrolytically remediating toxic organic compounds present in an aqueous medium forming an electrolysis solution, comprising inserting an electrolytic cell into the electrolysis solution; exposing the toxic organic compound in the electrolysis solution to the electrolytic cell comprising a cathode and an anode separated by a solid electrolyte therebetween, said anode having a substrate substantially chemically inert to the electrolysis solution having an oxide matrix thereon with additives to enhance the electrical conductivity and the chemical activity and the adhesiveness of the oxide matrix to the substrate, and applying a potential across the anode and cathode for a time sufficient to remediate the toxic organic compounds present in the electrolysis solution.

6. The method of claim 5, wherein the anode has a substrate selected from Sn, W, Zr, Ta, Ir, Pd, Pt, Ti, Au, Cu, Cu-Ag alloys, Ru, C and Ag.

7. The method of claim 5, wherein the anode substrate is selected from Sn, Pt, Ti, Cu, Cu-Ag alloys, Ru and Ag.

8. The method of claim 5, wherein the oxide matrix is selected from the oxides of Sn, W, Zr, Ta, Ir, Pd, Pt, Ti, Au, Cu, Cu-Ag alloys, Ru, C and Ag.

9. The method of claim 5, wherein the oxide matrix is selected from the oxides of Sn, Pt, Ti, Cu, Cu-Ag alloys, Ru and Ag.

10. The method of claim 5, wherein the additive enhancing the electrical conductivity of the oxide matrix is the oxide of antimony.

11. The method of claim 5, wherein the additive enhancing the chemical activity of the oxide matrix is selected from oxides of the transition metals.

12. The method of claim 5, wherein the chemically inert substrate is selected from Ir, Pt, Au, Pd, Ti and their alloys.

13. The method of claim 12, wherein the additive enhancing the chemical activity of the oxide matrix is the oxide of Ru.

14. The method of claim 13, wherein the additive enhancing the adhesiveness of the oxide matrix to the substrate is the oxide of the substrate metal.

15. The method of claim 14, wherein the chemically inert substrates is Ti and the additive enhancing the adhesiveness of the oxide matrix to the substrate is $TiO_2$.

16. The method of claim 5, wherein the anode is Ti having the oxides of Sb, Ti and Ru thereon.

17. An electrolytic cell, comprising a cathode and an anode separated by a polymeric electrolytic material, said anode having a substrate of Pt, Ti or alloys thereof and oxide additives thereon to enhance the electrical conductivity and the chemical activity and the adhesiveness of the oxide additives on the substrate and an electrolysis solution containing toxic organic compounds.

18. The electrolytic cell of claim 17, wherein the anode has a Ti substrate and the oxide additives are Sb, Ti and Ru.

* * * * *